(12) United States Patent
Fraser et al.

(10) Patent No.: US 6,565,336 B1
(45) Date of Patent: May 20, 2003

(54) NORMALLY UNSEATED SUCTION VALVE

(75) Inventors: Bruce A. Fraser, Manlius, NY (US); Wayne P. Beagle, Chittenango, NY (US); Peter F. Kaido, Verona, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/073,308

(22) Filed: May 6, 1998

(51) Int. Cl.[7] ................................................ F04B 39/10
(52) U.S. Cl. ........................ 417/569; 137/856; 417/446
(58) Field of Search .................................. 417/432, 433, 417/569, 571, 446, 447; 137/246, 856, 246.12, 246.13; 251/355

(56) References Cited

U.S. PATENT DOCUMENTS

| 1,834,038 A | 12/1931 | Summers |
| 2,001,885 A | 5/1935 | Ohmart |
| 2,020,508 A | 11/1935 | Knapp |
| 2,110,107 A | 11/1938 | Drysdale |
| 2,372,938 A | 4/1945 | Doeg |
| 2,981,462 A | 7/1961 | Niedermayer |
| 4,522,568 A | 6/1985 | Gelse et al. |
| 4,406,590 A | 11/1985 | Kessler |
| 4,580,604 A | 4/1986 | Kawaguchi et al. ........ 137/856 |
| 4,628,963 A | 12/1986 | Ishijima et al. ............ 137/856 |
| 4,642,037 A * | 2/1987 | Fritchman ................... 417/447 |
| 4,955,797 A | 9/1990 | Cowen |
| 5,035,050 A | 7/1991 | Cowen |
| 5,062,779 A | 11/1991 | Da Costa .................... 137/856 |
| 5,203,686 A | 4/1993 | Scheldorf et al. |
| 5,452,994 A | 9/1995 | Erickson ..................... 417/550 |
| 5,609,476 A | 3/1997 | Kim et al. .................. 417/447 |

* cited by examiner

Primary Examiner—Cheryl J. Tyler

(57) ABSTRACT

In its unstressed state, a suction valve is spaced from its valve seat such that the suction valve must be deformed against its inherent spring force in order to achieve seating. The spring force due to deformation provides an opening bias to the suction valve such that it opens earlier in the suction stroke and offsets the effects of adhesion due to the presence of oil between the seating surface and the valve.

1 Claim, 3 Drawing Sheets

NORMALLY UNSEATED SUCTION VALVE

BACKGROUND OF THE INVENTION

In positive displacement compressors employing suction and discharge valves there are both similarities and differences between the two types of valves. Normally the valves would be of the same general type. Each valve would be normally closed and would open due to a pressure differential across the valve in the direction of opening. The valve may be of a spring material and provide its own seating bias or separate springs may be employed. Since the suction valve(s) open into the compression chamber/cylinder they generally do not have valve backers in order to minimize the clearance volume and thus deflection of the valve is not physically limited. Discharge valves normally have some sort of valve backer so as to avoid excess movement/flexure of the discharge valve. Ignoring the effects of leakage, etc., an equal mass of gas is drawn into the compression chamber and discharged therefrom. However, the suction stroke takes place over, nominally, a half cycle whereas the combined compression and discharge stroke makes up, nominally, a half cycle. In the case of the suction stroke, the suction valve opens as soon as the pressure differential across the suction valve can cause it to unseat. Typically, the pressure differential required to open the suction valve is on the order of 15–35% of the nominal suction pressure. In the case of the compression stroke, compression continues with the attendant reduction in volume/increase in density of the gas being compressed until the pressure of the compressed gas is sufficient to overcome the combined system pressure acting on the discharge valve together with spring bias of the valve member and/or separate springs. Typically, the pressure differential required to open the discharge valve is on the order of 20–40% of the nominal discharge pressure. Accordingly, the mass flow rate is much greater during the discharge stroke.

By design, suction valves have a much lower seating bias than discharge valves. The low seating bias is essential due to the fact that valve actuation is initiated by the force resulting from the pressure differential across the valve. In the case of suction valves, opening generally occurs at pressures that are much lower than in the case of discharge valves. Therefore, only small pressure differences, and hence small opening forces, can be created for suction valves relative to potential pressure differences and opening forces for discharge valves. Even a small increase in the pressure differential across the suction valve results in a large percentage increase in the pressure differential across the valve. In contrast, an equal increase in the pressure differential across the discharge valve results in a much smaller percentage increase in the pressure differential because of the substantially higher nominal operating pressure.

The opening force, F, on a valve is given by the equation $$F=P \cdot A$$

where P is the pressure differential across the valve and A is the valve area upon which P acts. It should be noted that the direction in which the pressure differential acts changes during a complete cycle so that during a portion of a cycle the pressure differential provides a valve seating bias. When A is held constant, it is clear that a change in F is proportional to a change in P, or, more specifically, the percentage change in F is proportional to the percentage change in P. For example, assuming an operating condition where suction pressure is 20 psia and discharge pressure is 300 psia, at a typical overpressure value of 35% the cylinder will rise to 405 psia before the discharge valve opens. In contrast, at a typical underpressure value of 30%, the cylinder pressure will drop to 14 psia, before the suction valve opens. If the pressure differential required to open both valves is increased by 10 psia, the discharge overpressure value increases to 38% from 35% while the suction underpressure value increases to 80% from 30%. Thus, we can expect the opening force on the suction valve to increase 167%.

Particularly because of the effects of the clearance volume, the change in pressure differential across the suction valve would not increase very rapidly since the device is initially charged due to the compressed gas from the clearance volume and is then acting as a vacuum pump until the suction valve opens. Specifically, the inflow of gas to the cylinder is typically designed to occur during the last 95% of the combined expansion and suction stroke. In contrast, the compression chamber pressure rises rapidly as the compression stroke is being completed and the pressure can continue to rise during the discharge stroke if the volume flow exiting the cylinder does not match the rate of reduction in the compression chamber volume. Typically, the outflow of gas from the cylinder occurs during the last 40% of the combined compression and discharge stroke. Any substantial change in one or more of these relationships can result in operational problems relative to the valves.

Another complicating factor arises from the fact that under typical operating conditions, lubricating fluid (oil) coats all internal surfaces of a compressor, including the suction and discharge valves and valve seats. The associated problems as to improving discharge efficiency as related to the discharge valve have been addressed in U.S. Pat. No. 4,580,604. In the case of a discharge valve, the cylinder pressure must overcome the system pressure acting on the discharge valve, the spring bias on the valve and any adhesion of the valve to the seat. Accordingly, the adhesion of the discharge valve to the seat represents an over pressure and therefore an efficiency loss.

SUMMARY OF THE INVENTION

A typical reciprocating compressor will have a valve plate with an integral suction port and suction valve seat. When in the closed position, the film of oil present between the suction valve and its seat is very thin, on the order of a few molecular diameters. This is in part due to the fact that compression chamber pressure acts on and provides a seating bias for the suction valve during the combined compression and discharge stroke. In normal operation, the opening force applied to the suction valve is provided by a pressure differential across the valve that is created as the piston moves away from the valve during the suction stroke. Typically, the opening force needs to be large enough to overcome the resistance to opening caused by valve mass (inertia) and any spring or other biasing forces. The force also needs to be substantial enough to dilate and shear the oil film trapped between the valve and seat. Factors that influence the force necessary to dilate and shear the lubricant film include: the viscosity of the lubricant film, the thickness of the oil film, the inter-molecular attractive forces between the lubricant molecules, the materials of construction of the suction valve and/or valve seat, and the rate of refrigerant outgassing.

In traditional refrigerant-compressor applications using mineral-based (MO) or alkylbenzene (AB) lubricants, the resistance to opening caused by the lubricants is negligible as indicated by the relatively small pressure differential that is required to initiate valve opening. This is due, in large part, to the fact that MO and AB lubricants exhibit relatively low viscosity, low inter-molecular forces and good solubility with refrigerants over the entire range of operating conditions.

Newer, ozone-friendly refrigerant-compressor applications utilize polyol ester (POE) lubricants. When compared to MO or AB lubricants, POE lubricants can exhibit extremely high lubricant viscosity and poor solubility with HFC refrigerants such as R134a, R404A, and R507, particularly under low operating pressures and/or temperatures. The relatively high viscosity of POE's can cause a substantial increase in the force necessary to dilate and shear the oil film trapped between the valve and seat. Additionally, POE lubricants are very polar materials and hence have a strong molecular attraction to the polar, iron-based materials that are typically used to manufacture valves and valve seats. The mutual attraction of the materials of construction and the POE further increases the force necessary to separate the valve from the valve seat.

In order to generate the increase in force needed to separate the suction valve from its valve seat, the pressure differential across the valve must be increased with an accompanying delay in the valve opening time. When the suction valve does finally open, it does so at a very high velocity. Further, aggravating this condition is the increase in the volume flow rate of the suction gas entering the cylinder resulting from the delay in the suction valve opening. The increase in the volume flow rate of the suction gas causes an increase in suction gas velocity which, in turn, increases the opening force applied to the suction valve and, hence, the velocity at which the valve opens. The increased suction valve opening velocity resulting from the combined effects of a higher pressure differential on the valve due to the delayed opening and the higher volumetric flow rate of the flow impinging upon the suction valve causes the suction valve to deflect further than intended into the cylinder bore. Without the benefit of a valve backer, as would be present in a discharge valve, valve operating stress must increase as a result of the increase in valve deflection. If the operating stress exceeds the apparent fatigue strength of the valve, then valve failure will occur.

The present invention reduces the fluid pressure force required to open the suction valve by providing an opening bias to the suction valve by requiring the valve to deform slightly, within its plastic region, in order to achieve seating under cylinder pressure. Specifically, in its undeformed state, the suction valve seating surface defines a plane which is spaced from and nominally parallel to a plane defined by the seating surface of the valve seat. The spacing between the undeformed valve and the valve seat is on the order of 0.001 to 0.02 inches so that the inherent spring force due to the deflection of the valve to permit seating will tend to move the valve off of the valve seat earlier in the suction stroke. The actual spacing is influenced by the overall length of the valve as well as its thickness/stiffness. The preferred range is on the order of 0.001 to 0.005 inches. As a result, less stress due to inertia is produced when the valve tips hit the ledges which act as valve stops.

The unstressed spacing between the valve and valve seat will be determined by the desired spring bias to be produced and the thickness of the oil film. The spacing can be achieved by machining the valve seat relative to the surface of the valve plate. Additionally, the spacing can be achieved by placing a thin spacer between the suction valve and the valve plate.

It is an object of this invention to reduce suction valve adhesion to its valve seat.

It is an additional object of this invention to reduce operating stress on a suction valve.

It is a further object of this invention to provide a normally unseated suction valve.

It is another object of this invention to facilitate the release of the suction valve from its valve seat earlier in the suction stroke. These objects, and others as will become apparent hereinafter, are accomplished by the present invention.

Basically, when the suction valve is in an unstressed condition it is separated from its valve seat which results in an opening bias due to the inherent spring forces of the valve when it is deformed into seating contact with the valve seat.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
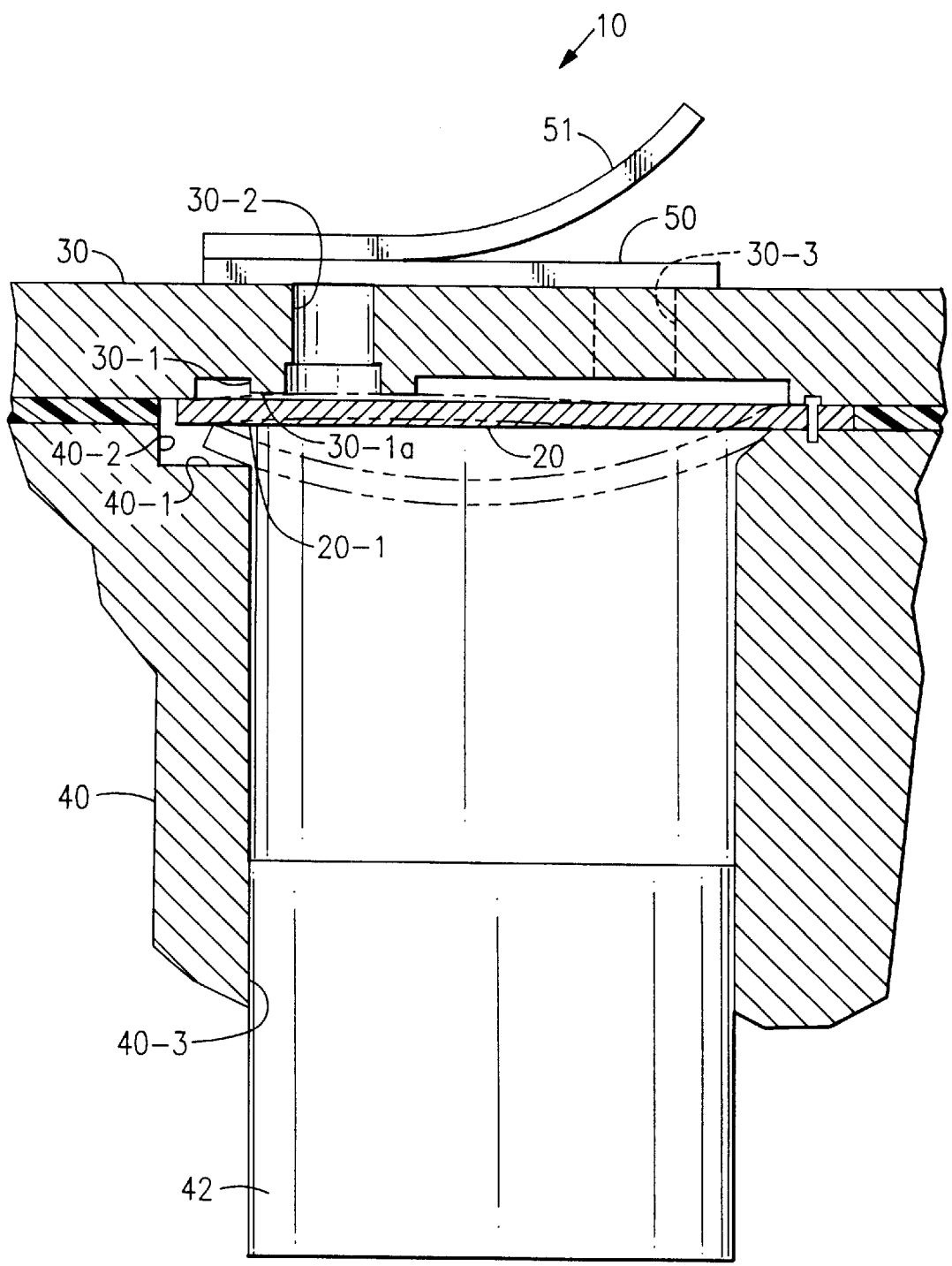
FIG. 1 is a sectional view of a portion of a reciprocating compressor employing the present invention.
Figure 2:
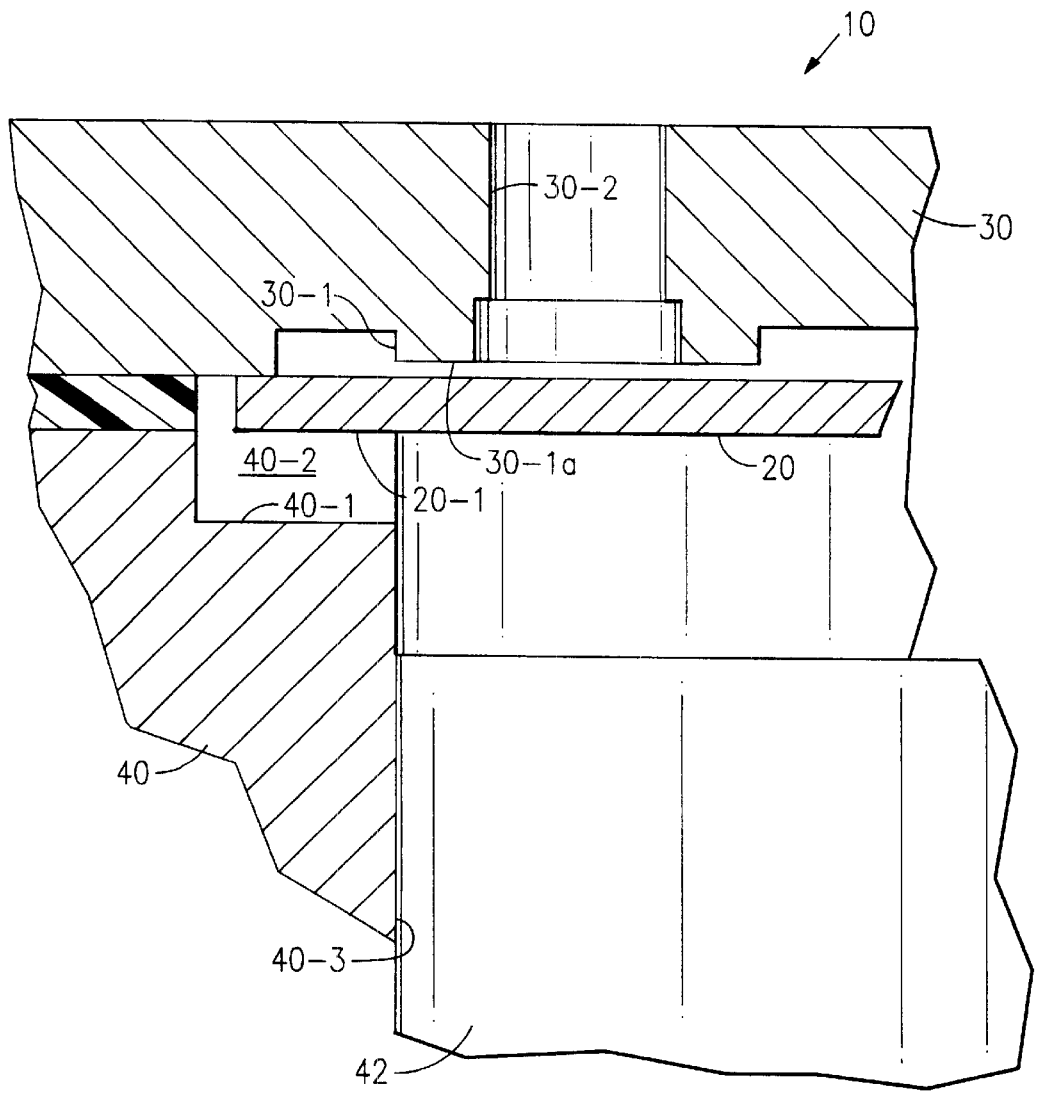
FIG. 2 is an enlarged sectional view of a portion of FIG. 1 showing the suction valve structure.

In FIGS. 1 and 2, the numeral 10 generally designates a reciprocating compressor. As, is conventional, compressor 10 has a suction valve 20 and a discharge valve 50, which are illustrated as reed valves, as well as a piston 42 which is located in bore 40-3. Discharge valve 50 has a backer 51 which limits the movement of valve 50 and is normally configured to dissipate the opening force applied to valve 50 via discharge passage 30-3 over its entire opening movement. In the case of suction valve 20, its tips 20-1 engage ledges 40-1 in recesses 40-2 in crankcase 40. Ledges 40-1 act as valve stops. Ledges 40-1 are engaged after an opening movement on the order of 0.1 inches, in order to minimize the clearance volume, with further opening movement by flexure of valve 20 as shown in phantom in FIG. 1. Annular valve seat 30-1 forms a portion of suction passage 30-2. Specifically, starting with valve 20 seated on seating surface 30-1a of valve seat 30-1, as shown in phantom in FIG. 1, initial movement of valve 20 is a straightening of valve 20 as it lifts off valve seat 30-1 due to the fluid pressure differential across valve 20 and aided by the inherent spring force of valve 20 due to its deflection to achieve seating. Once valve 20 reaches its straight or unstressed position further opening movement of suction valve 20 is as a cantilevered beam until tips 20-1 engage ledges 40-1 and then flexure is in the form of a beam supported at both ends. As shown in phantom in FIG. 1, valve 20 moves into bore 40-3. As illustrated in FIGS. 1 and 2, suction valve 20 is in its unstressed state in which it is spaced from valve seating surface 30-1a of valve seat 30-1. The spacing in the unstressed state would be on the order of 0.001 to 0.02 inches and is achieved by machining the valve seat 30-1. Accordingly, valve 20 is seated on valve seating surface 30-1a only when differential pressure acting on valve 20 is sufficient to overcome the inherent spring force of valve 20 resisting its seating and providing an opening bias when in the seated position. During the suction stroke, the inherent spring force coacts with the pressure differential across valve 20 to tend to cause it to open against the adhesion force of the lubricant film.

As discussed above, the POE lubricants tend to cause adhesion between valve 20 and seating surface 30-1$a$ of valve seat 30-1 formed in valve plate 30. Absent the opening spring bias of the present invention opposing the adhesion, valve 20 would open at a higher differential pressure and tend to strike ledges or stops 40-1 at a higher velocity such as to facilitate flexure into bore 40-3 which, when coupled with the impinging flow from suction passage 30-2 can cause flexure of valve 20 beyond its yield strength and/or drive valve so far into bore 40-3 that tips 20-1 slip off of ledges or stops 40-1.

Figure 3:
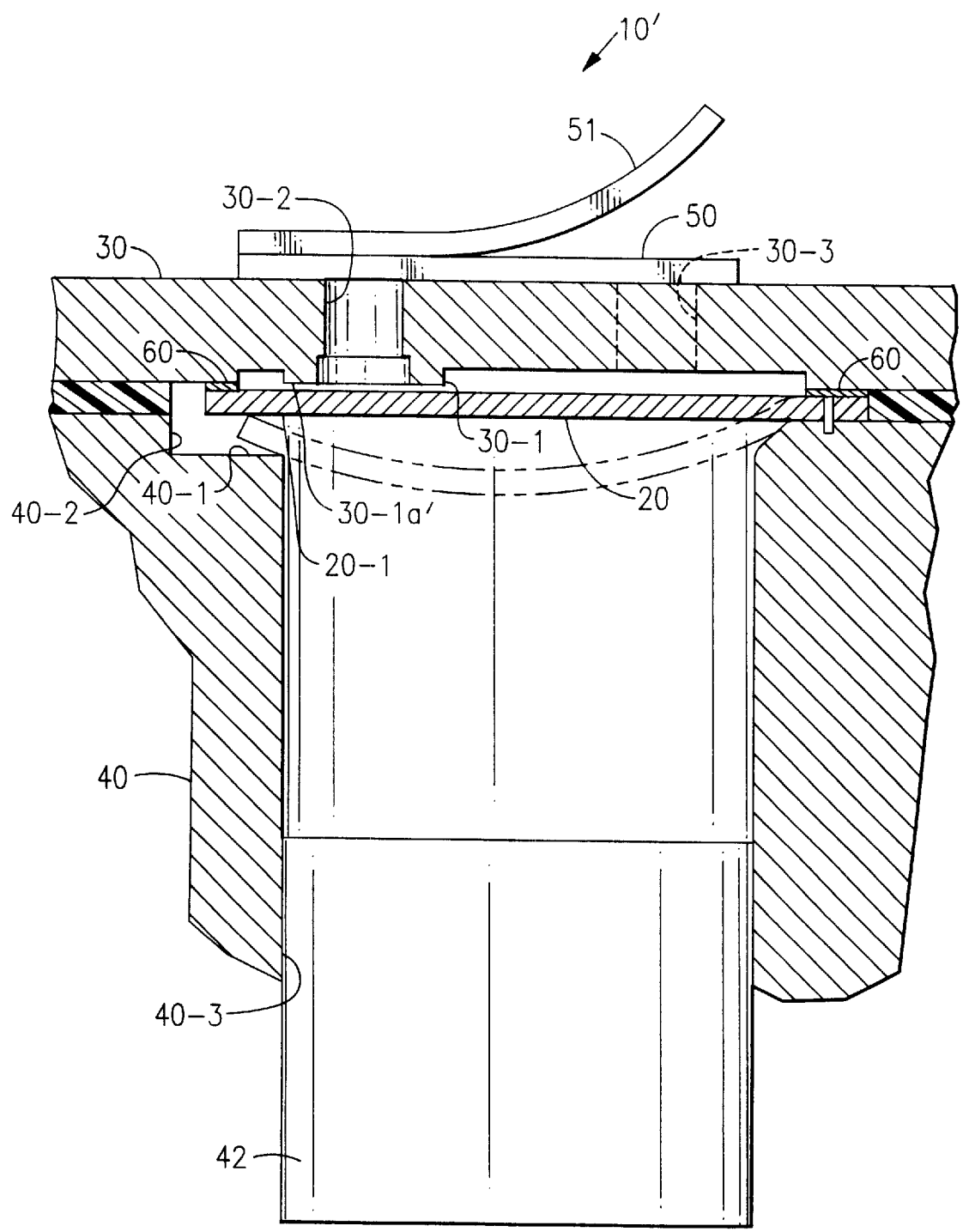
FIG. 3 is a sectional view of a portion of a reciprocating compressor employing a modified embodiment of the present invention.

Referring to FIG. 3, compressor 10' is identical to compressor 10 except that instead of machining the valve seat 30-1 to achieve the recessed surface 30-1$a$, valve 20 is spaced from valve seat surface 30-1$a'$ by placing a spacer or shim 60 between valve plate 30 and valve 20. The thickness of spacer or shim 60 is on the order of 0.001 to 0.02 inches thick, with 0.001 to 0.005 being preferred, to achieve the desired unstressed spacing of valve 20 from seat surface 30-1$a'$.

In the operation of the embodiment of FIGS. 1 and 2 and of the embodiment of FIG. 3, the valve 20, in its unstressed condition, will be spaced from seating surfaces 30-1$a$ and 30-1$a'$, respectively, a distance on the order of 0.001 to 0.005 inches. Accordingly, the valve 20 must be deformed against its inherent spacing force to achieve seating with the spring force providing an opening bias which opposes adhesion due to the presence of an oil film between the valve 20 and seating surfaces 30-1$a$ and 30-1$a'$, respectively. The opening bias due to deformation of the valve causes valve 20 to unseat earlier in the suction stroke.

Although preferred embodiments of the present invention have been illustrated and described, other changes will occur to those skilled in the art. It is therefore intended that the scope of the present invention is to be limited only by the scope of the appended claims.

What is claimed is:

1. In a reciprocating compressor having a cylinder with a piston therein, a suction valve and a valve plate with suction valve seat and lubricated by an oil which forms an oil film between said suction valve and said valve seat with at least a portion of said oil film being no more than a few molecular diameters thick, the improvement comprising:

said suction valve being unstressed and normally spaced from said valve seat when said suction valve is not being acted on by any other force, whereby said suction valve must be deformed to seat on said valve seat thereby producing an inherent spring bias tending to open said suction valve such that said suction valve opens earlier during a suction stroke said compressor; and a spacer located between said valve plate and said suction valve to space said suction valve from said valve seat when said suction valve is not being acted on by any other force.

* * * * *